United States Patent [19]

Bhakuni et al.

[11] 4,132,693

[45] Jan. 2, 1979

[54] CATECHOL MODIFIED RESORCINOL-FORMALDEHYDE LATEX CORD DIP

[75] Inventors: Roop S. Bhakuni, Copley; Richard F. Laske, Akron, both of Ohio

[73] Assignee: The Goodyear Tire & Rubber Company, Akron, Ohio

[21] Appl. No.: 804,403

[22] Filed: Jun. 7, 1977

[51] Int. Cl.$^2$ .............................................. C08L 61/12
[52] U.S. Cl. .................................... 260/29.3; 156/335; 428/261; 428/267
[58] Field of Search ...................... 260/29.3, 844, 845, 260/54; 156/335

[56] References Cited

U.S. PATENT DOCUMENTS

| Re. 23,451 | 1/1952 | Mighton | 428/250 |
|---|---|---|---|
| 3,704,200 | 11/1972 | Brown | 260/54 |

Primary Examiner—Theodore E. Pertilla
Attorney, Agent, or Firm—D. B. Little

[57] ABSTRACT

An aqueous alkaline dispersion of a rubber latex and dihydroxy-phenol-aldehyde resins consisting essentially of resorcinol-aldehyde resins and catechol-aldehyde resins is useful in forming an adhesive bond between reinforcing materials such as nylon and rubber compounds. It is essential that the catechol-aldehyde resin be made separately from the resorcinol-aldehyde resin with which it is later mixed in solution. The dispersions of this invention result in improved aged adhesion and lower fabric stiffness than the older resorcinol-formaldehyde latex dispersions.

10 Claims, No Drawings

CATECHOL MODIFIED RESORCINOL-FORMALDEHYDE LATEX CORD DIP

BACKGROUND OF THE INVENTION

This invention is concerned with catechol-aldehyde condensation products and their application in adhering polymers to reinforcing fabrics and cords. The commonly used cord-to-rubber adhesives are water dispersions of latex and resorcinol-formaldehyde resins with other ingredients such as carbon black and blocked polyisocyanates added for specific end results. The composition and process disclosed herein have substituted catechol-aldehyde resins for part or all of the resorcinol-formaldehyde resin.

The weaving, dipping, heat setting, and calendering of reinforcing fabric is explained in the *Kirk-Othmer Encyclopedia of Chemical Technology*, 2nd ed., Vol. 20, p. 334, (John Wiley & Sons, New York, 1969) which is incorporated by reference into this specification. Adhesive formulations are only one part of the complex technology of fabric processing.

Resorcinol-formaldehyde latex adhesives for adhering reinforcing fabric to rubber have been known and used for years. They are the subject of many patents which cover variations in latices used, modifications of the resin, and additional ingredients for resistance to heat degradation, stronger bond, or other beneficial effects.

Polyhydroxy and dihydroxy phenols in general have been disclosed and claimed in several of the prior art patents and in the literature. U.S. Pat. No. 2,128,635 discloses and claims the application to fabric of dihydric and polyhydric phenol-aldehyde condensation products mixed with rubber latex for bonding the fabric to rubber. This was one of the earliest cord dip adhesives for rayon cord.

Blends of vinylpyridine/diene hydrocarbon latices with polyhydric phenol-aldehyde heat convertible resol are described and claimed in U.S. Pat. No. Re. 23,451. These are the first successful adhesives developed for use on nylon tire cord. Catechol is mentioned as an example of a suitable polyhydric phenol.

An improvement on the vinylpyridine/diene type adhesives is revealed in U.S. Pat. No. 3,194,294 which teaches the stabilization of these dip solutions by incorporating a methylol-containing formaldehyde donor and ammonia into the mixture. Although dihydroxy and polyhydroxy phenols are said to be suitable, those with hydroxy groups meta to each other are specifically mentioned as substitutes for resorcinol (column 5, line 46), which would exclude catechol.

Dihydric or polyhydric phenolic resins are also either disclosed or claimed in two Canadian Patents, Nos. 834,806 (corresponds to U.S. Pat. No. 3,437,122) and 984,076.

In all of the prior art patents disclosing or claiming dihydric or polyhydric phenolic resins listed above, the great majority of the working examples utilize resorcinol-formaldehyde resins and none of the examples utilize catechol-formaldehyde resins. In fact, of the three dihydric phenols (resorcinol, catechol, and hydroquinone) only resorcinol is commercially important in adhesive resin manufacture. Although catechol undergoes many of the typical reactions of phenols, in most of them it is considerably less reactive than resorcinol.

The condensation of aldehydes such as formaldehyde and acetaldehyde with catechol leads to methylenedipyrocatechol compounds and higher molecular weight condensates. Such a reaction with formaldehyde is described in Chemical Abstracts 54:3287b, which teaches heating the reactants at a pH of 10 for satisfactory results. This type of reaction is used in latex to strengthen molded products as taught by U.S.S.R. Pat. No. 168,413 (C.A. 63:P775a). Catechol-formaldehyde resin is used in a process for treating papermaker's felt in U.S. Pat. No. 3,386,849.

Catechol-formaldehyde condensation products have also been utilized in the stabilization of nylon against ultraviolet light and oxidation (U.S. Pat. No. 2,388,676 and Japanese Pat. No. 2,187 issued Mar. 28, 1961).

SUMMARY OF THE INVENTION

Catechol-aldehyde resins have not, in the past, been identified with any superior adhesive properties. However, it has now been discovered that they do impart certain very desirable properties to reinforced rubber articles — namely improved aged adhesion and lower fabric stiffness.

The process of manufacturing a typical resorcinol-formaldehyde latex adhesive is generally comprised of the following steps:

1. Dissolve resorcinol in water in the mixing tank.
2. Add a suitable aldehyde such as formaldehyde in solution form to the solution in 1.
3. Add sodium hydroxide (or another suitable base such as ammonium hydroxide or potassium hydroxide) slowly to the mixing tank.
4. After the resin is formed add the latex.
5. Age for approximately 12 to 24 hours.

The ratios of the ingredients can vary appreciably depending upon such factors as the latex used, the cord to be coated, and the end product. These ratios have been extensively investigated already, and those found in the prior art patents are typical. U.S. Pat. No. 2,128,635 (Examples I–IV); U.S. Pat. No. Re. 23,451 (Examples I–X, Examples XII–XVI, and column 14, lines 20–25); and U.S. Pat. No. 3,268,467 (Example 4) should be referred to for details. Generally, the mole ratio of resorcinol to formaldehyde (or other aldehyde) is from 1:10 to 3:1, and a ratio between 1:3 and 1.4:1 is preferred.

Formaldehyde is the preferred aldehyde and the one most commonly employed, but any aldehyde may be used which is water soluble to the extent of at least ½ to 5 weight percent and capable of condensing with a dihydric phenol in a reasonable length of time. Examples of other suitable aldehydes are acetaldehyde, furfural, propionaldehyde, and crotonaldehyde. There can also be used materials which under the conditions of reaction liberate formaldehyde, examples of which are given in U.S. Pat. No. Re. 23,451, column 13, lines 65–73.

When sodium hydroxide is used as the base catalyzing the resinification reaction, the mole ratio of sodium hydroxide to resorcinol is generally from 0.05:1 to 0.4:1. In the case of other bases, the gram equivalent corresponding to these ratios for sodium hydroxide would be used.

The process is usually carried out at atmospheric pressure and room temperature although a cooling means is sometimes employed to remove the heat of the resinification reaction.

The latex is selected for the properties which it imparts to the fabric and to the final product. Vinylpyridine/diene terpolymers and copolymers (such as styrene/1,3-butadiene/alpha-vinylpyridine terpolymer and 1,3-butadiene/alpha-vinylpyridine copolymer) are often used for their excellent adhesive properties. The term "vinyl pyridine" is intended to encompass alpha, beta and gamma vinylpyridines and their homologues as listed in U.S. Pat. No. Re. 23,451, column 12, lines 19-27. Other latices which are used are: natural rubber, neoprene, acrylonitrile/butadiene copolymer, polybutadiene, ethylene/propylene/diene terpolymer, styrene/butadiene copolymer (SBR) and chlorosulfonated polyethylene. Often the latex is chosen to be compatible with the rubber which will later be applied to the reinforcing cord, for example, SBR latex for SBR rubber. Also, blends of different latices (such as styrene/1,3-butadiene/vinylpyridine terpolymer with SBR latex) are utilized, and the term "latex" as used herein is intended to encompass such blends. The dry weight ratio of latex solids to resin ranges from 14:1 to 1:9 and is preferably from 12:1 to 1:1.

This invention has modified the normal process for manufacturing adhesive dip as explained above. A catechol-aldehyde resin is made by reacting catechol and an aldehyde in the presence of a base in water at a temperature of from 40° to 95° C. The mole ratio of catechol to aldehyde is in the same range as the resorcinol/aldehyde ratio stated previously. The mole ratio of sodium hydroxide (or gram equivalent of another base) to catechol is from 0.1 to 1.0 and preferably from 0.4 to 0.8. A sufficient quantity of the resin is normally made for use in several batches of cord dip adhesive. This operation is called preforming.

This procedure (preparing the resorcinol-aldehyde and catechol-aldehyde resins separately) has three principal advantages: (1) the cord dip mixing time is independent of the relatively longer reaction time for catechol-aldehyde resin; (2) the resorcinol and catechol are not competing for the same reactive sites on the aldehyde molecules; and (3) reaction temperature can be controlled at the best setting for the catechol-aldehyde and the resorcinol-aldehyde reactions independently. If resorcinol and catechol were to be reacted in the same system with an aldehyde, the resorcinol would react much faster with the aldehyde, thus affecting the ratio of the two resins and the type of resin obtained, and the mixing time would have to be increased to accomodate the catechol.

The preformed catechol-aldehyde resin is added as an ingredient to the adhesive between steps 3 and 4 of the process given previously. The amount of resorcinol-aldehyde resin made is reduced by the corresponding amount of catechol-aldehyde resin with which it is replaced. The total amount of resin remains roughly the same as in the older recipes. The weight ratio of resorcinol-aldehyde resin to catechol-aldehyde resin may range from 30:70 to 98:2 and is preferably from 40:60 to 70:30.

Although the prior art does teach the use of catechol as a suitable dihydric phenol in making phenol-aldehyde resins for cord dips, it does not teach that a cord dip containing a mixture of catechol and resorcinol resins achieves superior results over the single-resin dips, nor does it teach the necessity of making the two resins separately.

The process and product of this invention, without diminishing fabric properties obtained using the old resorcinol-formaldehyde latex dips, have unexpectedly increased adhesion of the fabric to rubber in aged samples and have decreased fabric stiffness. An increase in aged adhesion or higher retention of adhesion upon aging of dipped fabric is of great commercial importance, when dipped fabric is shipped around the world and kept in inventory for extended periods. Decreased fabric stiffness is desirable in tire manufacturing for reduced defective tires due to blister and blows.

The cord dip adhesives of this invention can be utilized with reinforcing cords of rayon, nylon, polyester, and aramid polymers.

The finished reinforcing cord produced by applying the adhesives of this invention to reinforcing cord and processing wetted cord in the normal manner (e.g. heat set under tension) can be incorporated in a variety of reinforced rubber articles such as tires, hose, and conveyor belts.

PREFERRED EMBODIMENTS OF THE INVENTION

The following examples are presented to illustrate and not to limit this invention. Except as otherwise noted, parts are parts by weight, and percentages are by weight.

EXAMPLE I

A conventional resorcinol-formaldehyde latex (RFL) cord dip adhesive was made according to Example 4 of U.S. Pat. No. 3,268,467. Another adhesive of the same composition except that the resin was comprised of a 80:20 mixture of resorcinol-formaldehyde/catechol-formaldehyde resins was also made. The two adhesives were tested for adhesion using ASTM Test No. D2138 (U-Adhesion) on two types of nylon cord. The results appear in Table 1.

Table 1

| | Adhesion Aging - Nylon 6 (1260/3) | | | |
| | "U" Adhesion (Newtons) | | | |
| | Cord A | | Cord B | |
| Adhesive System | Original | Aged | Original | Aged |
| --- | --- | --- | --- | --- |
| Resorcinol Dip | 163 | 169 | 146 | 65 |
| Catechol-Resorcinol Dip | 127 | 187 | 158 | 113 |
| Cord Aging Conditions - 5 hrs at 149° C. and 276 kPa in Airbomb | | | | |

In both cases, the aged adhesion of the cord dipped in the catechol-resorcinol adhesive showed a marked improvement in aged adhesion compared to the RFL adhesive.

EXAMPLE II

A catechol-formaldehyde (CF) resin formulation was prepared and used to replace various amounts of the resorcinol-formaldehyde (RF) portion of a production adhesive formulation similar to that of Example I. Nylon 66 (1260/3) was processed with these dips under standard conditions and was then calendered in a natural rubber compound, vulcanized, and tested.

In addition to the U adhesion test several other tests were run on samples of the rubber/fabric composite, which tests included: (1) Peel Adhesion, ASTM D413; (2) Flex Strip Adhesion, ASTM D2630; and (3) stiffness as measured on the Gurley Stiffness Tester (manufactured by W. and L. E. Gurley of Troy, N.Y.). The results have been recorded in Table 2:

Table 2

| Resin ratio, RF/CF | 100/0 Control | 80/20 | 60/40 | 40/60 |
|---|---|---|---|---|
| Peel Adhesion | | | | |
| Adhesion force (Newtons) | 191 | 187 | 209 | 200 |
| % Coverage | 75 | 75 | 75 | 70 |
| 1" Flex Strip Adh | | | | |
| Unflexed (Newtons) | 107 | 94 | 107 | 94 |
| % Coverage | 85 | 80 | 90 | 90 |
| Flexed (Newtons) | 49 | 49 | 89 | 71 |
| % Coverage | 80 | 85 | 85 | 90 |
| U Adhesion (Newtons) | | | | |
| Original | 165 | 165 | 165 | 178 |
| Oven Aged 24 hrs, 121° C | 67 | 76 | 94 | 102 |
| Bomb Aged 5 hrs at 149° C. 276 kilopascals | 160 | 179 | 200 | 173 |
| Stiffness (Milligrams/end) | 165 | 152 | 129 | 123 |

Performances of the resorcinol-formaldehyde/catechol-formaldehyde adhesives was equal to the control for static adhesion and peel adhesion. There is an indication of superior dynamic adhesion and aged adhesion for the dips containing catechol and reduced fabric stiffness.

While certain representative embodiments and details have been shown for the purpose of illustrating the invention, it will be apparent to those skilled in this art that various changes and modifications may be made therein without departing from the spirit or scope of the invention.

What is claimed is:

1. A process of making an adhesive comprising the steps of:
   (a) reacting together catechol, an aldehyde, and an inorganic base in a condensation reaction to form a water soluble catechol/aldehyde resin, and
   (b) mixing the resin from step (a) together with a mixture comprising water, resorcinol/aldehyde condensation product, and a latex.

2. The process of claim 1 wherein step (b) is carried out in the following sequence:
   (1) dissolving resorcinol in water,
   (2) dissolving a suitable aldehyde in the solution in (1),
   (3) dissolving an inorganic base in the solution in (2),
   (4) mixing the resin from step (a) with the solution in (3),
   (5) mixing the latex with the resin solution in (4), and
   (6) aging the mixture in (5).

3. The process of claim 2 wherein step (a) is carried out using a mole ratio of catechol to aldehyde of from 1:3 to 1.4:1.

4. The process of claim 3 wherein the aldehyde in step (a) is formaldehyde.

5. The process of claim 4 wherein the base in step (a) is sodium hydroxide.

6. The process of claim 5 wherein the latex is a blend of styrene/1,3-butadiene/vinylpyridine terpolymer and SBR latices.

7. An alkaline aqueous adhesive composition comprising
   (a) a latex of a rubbery polymer, and
   (b) an aqueous solution of alkaline-catalyzed dihydroxy-phenol-aldehyde resins which consist essentially of resorcinol-aldehyde condensation product and catechol-aldehyde condensation product in a weight ratio of resorcinol-aldehyde product to catechol-aldehyde product of from 30:70 to 98:2.

8. The adhesive as recited in claim 7 wherein the ratio of resorcinol-aldehyde condensation product to catechol-aldehyde condensation product is from 40:60 to 70:30.

9. The adhesive as recited in claim 8 wherein the resorcinol-aldehyde condensation product is resorcinol-formaldehyde resin, and the catechol-aldehyde condensation product is catechol-formaldehyde resin.

10. The adhesive as recited in claim 9 wherein the latex is a blend of styrene/1,3-butadiene/vinylpyridine terpolymer and SBR latices.

* * * * *